United States Patent
S. et al.

(10) Patent No.: US 12,101,546 B2
(45) Date of Patent: Sep. 24, 2024

(54) HOT-PLUGGABLE GMSL CAMERA SYSTEM

(71) Applicant: e-con Systems India Private Limited, Chennai (IN)

(72) Inventors: Akash S., Chennai (IN); Rohith R. Yadav, Chennai (IN)

(73) Assignee: e-con Systems India Private Limited, Chennai (IN)

( * ) Notice: Subject to any disclaimer, the term of this patent is extended or adjusted under 35 U.S.C. 154(b) by 103 days.

(21) Appl. No.: 18/108,994

(22) Filed: Feb. 13, 2023

(65) Prior Publication Data

US 2024/0276091 A1    Aug. 15, 2024

(51) Int. Cl.
*H04N 23/60* (2023.01)
*G06F 13/40* (2006.01)
*G06F 13/42* (2006.01)

(52) U.S. Cl.
CPC ........ *H04N 23/60* (2023.01); *G06F 13/4081* (2013.01); *G06F 13/4282* (2013.01)

(58) Field of Classification Search
CPC .... H04N 23/60; H04N 1/00538; H04N 23/66; H04N 5/268; G06F 13/4081; G06F 13/4282
See application file for complete search history.

(56) References Cited

U.S. PATENT DOCUMENTS

| | | | |
|---|---|---|---|
| 10,893,185 B2 * | 1/2021 | Kamiya | H04N 23/66 |
| 10,924,702 B2 * | 2/2021 | Wang | H04N 5/268 |
| 10,931,914 B2 * | 2/2021 | Unno | H04N 9/87 |
| 10,951,806 B2 * | 3/2021 | Horie | H04N 1/00538 |
| 2010/0111489 A1 * | 5/2010 | Presler | H04N 25/75 348/222.1 |
| 2019/0268564 A1 * | 8/2019 | Mefford | H04N 7/12 |
| 2022/0021756 A1 * | 1/2022 | Fuller | H04L 1/0061 |
| 2023/0292994 A1 * | 9/2023 | Härter | A61B 1/00006 600/109 |

FOREIGN PATENT DOCUMENTS

| | | |
|---|---|---|
| CN | 103546741 A | 1/2014 |
| CN | 104539945 A | 4/2015 |
| CN | 113364974 A | 9/2021 |
| CN | 111475347 A | 5/2022 |
| CN | 113099187 A | 6/2022 |

* cited by examiner

*Primary Examiner* — Hung H Lam

(57) ABSTRACT

A Hot-Pluggable GMSL Camera System wherein a MIPI camera sensor is connected to a corresponding serializer block with an I2C interface, the corresponding serializer is connected to a corresponding deserializer block by a GMSL cable of up to at least 15-30 meters through an electrical connector, the deserializer block is connected to the Host Processor. A signal of the status of electrical connection of the GMSL cable is generated and communicated to the Host Processor, wherein an unplugging of the activated GMSL cable would produce a signal communicated to the Host Processor, and a plugging-in, or connecting of the same cable or a replacement cable or more than one GMSL cable communicated to the Host Processor. The GMSL camera system detects intermittent connections that are regarded as a micro-unplugging and a micro-hot-plugging, and displaying a proprietary video frame in response to hot-unplugging.

20 Claims, 22 Drawing Sheets

HOT-PLUGGABLE GMSL CAMERA SYSTEM

FIELD OF THE INVENTION

The present invention relates to 'gigabit multimedia serial link' (GMSL) compatible camera system, particularly, the present invention relates to hot plugging of GMSL camera system, and more particularly to safe hot plugging and hot unplugging of GMSL camera system.

BACKGROUND OF THE INVENTION

Current digital world has innumerable presence of digital camera all around. Application of digital camera has unprecedentedly grown from use for a quick selfie click to robotics, smart traffic, autonomous traffic, micro-surgeries and so forth.

Associated technological challenges include but are not limited to transmission of higher and higher uncorrupted media data volume over longer distance, safely and economically. One example of a standardized form of data transmission includes a 'mobile industry processor interface' (MIPIR), which is a known high-speed protocol device which transmits video and image data between a camera and the host processor, and facilitates a bandwidth of the order of 5-6 gigabits per second. A MIPI interface having the 'CSI-2' protocol standard, connects an image sensor with an embedded board to control and process the image data. This helps the sensor and embedded board to act together as a camera system to capture images and is preferred over USB connected cameras. However, maximum cable length for a typical MIPI CSI-2 camera connection is limited typically to 1 m.

Prior non-GMSL camera systems of the CSL-2 communication protocol may have a Camera module integrated with parallel or MIPI CSI-2 interfaces are generally interfaced with a processors like NVIDIA's Jetson AGX Orin™, Jetson AGX Xavier™, Jetson Xavier™ NX, Jetson™ TX2 NX, & Jetson Nano™, NXP's i.MX8, i.MX7, & i.MX6, Texas Instruments® TDA4VM, Qualcomm® QCS610, Google Coral Dev Board, Rockchip RK3399 Board, Raspberry PI 4, to name a few. Such a non GMSL camera system could likewise be with a USB interface. Major limitation, however, is a constraint of a length of a physical connection being restricted to 30 cm-100 cm.

For a common large size vehicle like a "container-truck" the distances between the computing unit and each camera module is far larger than 30 cm. It is now known that 'Gigabit Multimedia Serial Link,' abbreviated as GMSL, can be more helpful enabling a relatively 'long-distance' transmission up to a distance of 15-30 m. GMSL compatible cameras can be placed 15 or more meters away from the host processor through the 50Ω coaxial cable or 100Ω Serial Twisted Pair (STP) cable, to operate at full speed, and still support a high frame rate and less latency. US20220021756A1 elaborately disclose prior art related to MIPI translation into GMSL.

Technology for reliable hot plugging/unplugging for (a) long length (15 to 30 meters) transmission AND (b) capable of managing gigabits of multimedia data are still shied away from. While GMSL based camera solutions solve long length challenges, GMSL camera solutions are NOT known to support hot-pluggable feature, i.e., the GMSL camera cannot be removed/connected safely when the system is active. For general background regarding 'hot plugging', refer to patent document CN113364974A describing the method for power supply control to avoid damage to the camera due to hot plugging. Patent document CN111475347A discusses hot plugging function related to a MIPI interface, a DVP interface or a USB interfaced camera/devices. Patent document CN104539945A treats inrush current and voltage spikes corresponding to hot plugging and unplugging as analogous to an electrical fault and switches off the device/camera. Patent document CN113099187A too considers hot plugging as an electrical/thermal abnormality. Patent document CN103546741A discusses hot plugging related to an HDMI interface, which is a short length interface.

The present invention is specific to Gigabit Multimedia Serial Link (GMSL) based Camera System.

It is known that the GMSL serializer and deserializer are high speed communication integrated circuits (ICs) that fully support the high bandwidth, complex interconnect, and data integrity requirements needed to support evolving automotive infotainment and advanced driver assistance systems (ADAS). With GMSL Technology, uncompressed camera video streams are transmitted over specially designed coaxial cables over a longer distance without any data loss. In general, the GMSL Serializer and Deserializer chipsets are known with a provision for respective external connectors, through which GMSL cables are plugged into. Under ideal working conditions, once the gigabit multimedia serial link is established, data transfer takes place provided the GMSL cables are fitted properly into the respective external connectors.

FIG. 1 shows a basic non GMSL camera system, wherein a Camera module (20) integrated with parallel or MIPI CSI-2 protocol (26) are generally interfaced with a controller (45) like NVIDIA's Jetson AGX Orin™, Jetson AGX Xavier™, Jetson Xavier™ NX, Jetson™ TX2 NX, & Jetson Nano™, NXP's i.MX8, i.MX7, & i.MX6, Texas Instruments® TDA4VM, Qualcomm® QCS610, Google Coral Dev Board, Rockchip RK3399 Board, Raspberry PI 4, to name a few. Such a non GMSL camera system could likewise be with a USB interface. Major limitation, however, is a constraint of a length of a physical connection (10) being restricted to 30 cm-100 cm.

Requirements of 'Advanced Driver Assistance Systems' (ADAS) for particularly long transport vehicles (9), FIG. 2, cannot be satisfactorily catered with this limitation, where a physical distance (8) between camera module (20) and host controller (45) runs into several meters.

Currently, the GMSL link is required to be connected before the host system is powered up and stay connected under all scenarios until the host system is powered down. However, if the link is connected after the host system is turned ON, then the existing GMSL camera systems will not be able to detect the camera's connection and if the link is disconnected during operation, the known systems resort to malfunctioning as there are no provisions to detect such scenarios.

In the event the GMSL cable is unplugged during active camera data transfer, the GMSL cable gets disconnected but a receiver application in the Host Processor does not know that the camera is disconnected, causing it enter an unknown state resulting in system hang/crash/instability. The inability to detect camera or link connection or disconnection in such systems is managed by performing a full system power cycle in case the GMSL cable disconnection occurs.

There are complications to hot plugging and hot unplugging which include a 'micro-hot-plugging' and 'micro-unplugging,' a phenomenon that is associated with disconnection and re-connection of infinitesimally small time duration. This phenomenon is a result of vibrations and may eventually lead to a mechanical failure of an electrical connection within an electrical connector. Such micro-hot plugging and micro-unplugging is a physical and consequential electrical phenomenon associated with a current and or a voltage spike and with a higher probability of data corruption. While such a gradually developing failure may not be otherwise detectible till a complete breakdown of communication takes place, there is a need to provide a prediction or detection of this condition before complete failure.

SUMMARY OF INVENTION

The present invention is specific to Gigabit Multimedia Serial Link (GMSL) based Camera System, wherein the active GMSL system cable connection/disconnection ('Hot Plugging', 'Hot Unplugging') is effectively and economically managed and the camera streaming is restored to normal operation and without GMSL system damage, and without performing a full system power cycle, plugging and hot unplugging destabilizing a GMSL camera system.

In context of the present invention, hot plugging implies plugging IN of a new GMSL cable, which is connected to a Camera sensor through a serializer block, to a deserializer block already powered up through a previously initialized Host Controller. Hot unplugging implies plugging OUT of a previously connected GMSL cable which was connected to a Camera sensor through a serializer block, to a deserializer block already powered up through the previously initialized Host Controller. Hot unplugging also includes damage to GMSL cable, serializer block and or camera sensor due to which the deserializer block does NOT receive multimedia video/frames.

The present invention provides a 'Hot Pluggable' GMSL Camera Processing System that detects the absence of link by a computer program executing a set of instructions generally residing in the Host processor, without or with addition of any further hardware or device, wherein the absence of link is also termed as "inactive" link, and likewise presence of link is also termed as "active" link.

An absence of GMSL cable connection between camera and processor interfaces implies a state of unplugging of the camera sensor, and the computer program as per the present invention sends at least a proprietary frame (image) to the Host processor and prevents system crash/hang. The proprietary frame would carry a situational information as needed. The situational information illustratively includes a running outage time clock, outage count in a prescribed period. The situational information is exploitable for further diagnostics. The present invention further facilitates a user to select and configure his/her own proprietary frame. The proprietary frame is an indication of system behaving as anticipated and a confirmation that the system is NOT hung/crashed.

The present invention includes at least three distinct hardware embodiments. If an embodiment Host Processor is NOT suitable for I2C interfacing, a USB controller is introduced as an additional hardware to enable our software solution. Also, a circuit interrupter and circuit protections are introduced for addressing unintended rapid sequential unpluggings, defined as micro-unplugging, to avoid the avoid the otherwise likely mechanical/electrical failures.

In a preferred embodiment of the present invention the serializer block converts MIPI CSI-2 protocol to GMSL serial output while sending and receiving control channel data, enabling transmission of video and bi-directional control data over the GMSL cable of 15 to 30 meters in length.

The deserializer block re-converts GMSL input received from the serializer block to MIPI CSI-2 protocol. It also sends and receives side-channel data, enabling full-duplex transmission of forward path video and bi-directional control data over GMSL cable, which could be a low-cost 50Ω coaxial or a 100Ω shielded twisted pair (STP) cables meeting the GMS Link channel specification. GMSL cable is also interchangeably termed GMSL link. The present invention is focused on a nagging technological gap of hot plugging and hot unplugging destabilizing a GMSL camera system.

An embodiment of the present invention comprises a deserializer block and a serializer block, the serializer block and the deserializer block being mutually compatible (illustratively the MAX9257A serializer which pairs with the MAX9258A deserializer) can be used to form a complete digital video serial link), interconnected with a GMSL cable, also known as a GMSL coaxial cable, wherein a MIPI Camera sensor associated with its control blocks are connected to the serializer block. When such GMSL camera system is powered up, the deserializer block is initialized by a Host controller and programmed to feed electrical power to the serializer block via the GMSL cable or the GMSL coaxial cable. On receiving the electrical power, the serializer block establishes a communication channel link with the deserializer block and the Host controller is enabled to detect the communication from the Serializer/Deserializer I2C status registers. The I2C protocol, as is known, is used to establish communication between two or more ICs (Integrated Circuits), hence known as Inter-Integrated Circuit (I2C) communication. I2C is essentially a synchronous, multi-controller/multi-target (master/slave), packet switched, single-ended, serial communication. I2C is also represented as $I^2C$, with number 2 as a superscript. I2C is also represented as IIC. On receiving a request to stream from a User Application device, in this case a camera sensor suitable as a "MIPI camera", the Host Controller configures the MIPI Camera sensor via I2C protocol. As the MIPI Camera Sensor outputs an array of image frames, the Serializer block serializes the input MIPI Camera data and transmits over the GMSL cable. The Deserializer block converts the serialized data back to proper MIPI data and feeds it to the Host Controller's MIPI Interface. In the event that the GMSL cable is unplugged, the communication link gets disrupted abruptly.

It is to be noted that upon cable/link disconnection, the Serializer block, the Camera sensor, is turned off abruptly. In a prior art scenario, the Host Controller would randomly look for arrival of the Camera frames and would NOT be able to re-start even if the camera frames arrival halted for a marginally longer time than a vertical blanking time, which is a prescribed time for the deserializer between end of final visible line of a frame and beginning of first visible line of next frame, visible lines being frame (raster) lines. As a result, the end user Application will come to a HALT state.

The present invention involves both a software and a hardware mechanism that keeps checking the GMSL connection status periodically by polling of the GMSL link-lock status register using I2C interface between the Host processor and the Deserializer. When the GMSL cable is re-connected, the Host Controller re-configures the MIPI camera connected to the GMSL serializer via I2C. The computer executable commands ensure that all the configurations performed during the initialization phase, are performed again by the Host Controller upon GMSL cable reconnection. Once the reconfiguration is performed, the Host Controller issues a Camera stream request to resume flow of image data in the GMSL link, thus provides a seamless resumption of the Camera Streaming in the end user Application. This hot-pluggable and hot unpluggable feature allows the user to disconnect and reconnect the camera at serializer or deserializer side at any point of time while the host system is active, or the camera is streaming. This hot-pluggable and hot unpluggable feature also manages unintentional disconnect and reconnect situations at the camera, at serializer or deserializer side including the electrical connector and the GMSL cable at any point of time while the host processor is active, or the camera is streaming.

As per the present invention, the Host Processor is notified about the disconnection/reconnection of the cable and is equipped with inventive countermeasures to handle the GMSL cable disconnection/connection scenarios. Furthermore, there are several embodiments of the above concept with identical and minimum hardware, that include:

Embodiment 1: Polling the link lock register in the deserializer block, to check continuously if the GMSL link connection has been established or not and based on that the camera can be initialized or de-initialized.

Embodiment 2: Instead of polling the link lock register in the deserializer block, polling of any register in the serializer block from the host, if we get a ACK from serializer block it means that the connection is present; if we get a NACK it means the GMSL link is not connected. ACK and NACK imply Acknowledge (ACK) and Not Acknowledge (NACK), which are an acknowledge bite or a Non acknowledge bite respectively.

Embodiment 3: The deserializer block has a link lock output pin. The deserializer block drives this pin HIGH when serializer is connected and drives LOW when no connection is established which can be used as an interrupt to the Host whenever a general purpose input/output (GPIO) changes its state, so based on the state of the GPIO, the camera is initialized or de-initialized. This method is more efficient than the method 1 and 2, as we do the initialization and de-initialization only when we get the interrupt. we don't have to continuously poll the register in the deserializer block which may lead to I2C bus traffic issue if the frequency of the polling is relatively high and would increase the Host Processor's utilization.

The inventive solution described as a preferred embodiment is as applicable to the Host processor having I2C interfacing, illustratively processors like NVIDIA, NXP, TI, QUALCOMM which have provision for I2C interfacing.

When the host processor does not have I2C processing then an I2C communication capable microcontroller unit is integrated with the deserializer block to poll the link lock status, while multimedia communication continues on MIPI interface between deserializer block and the Host processor.

The present invention also provides a predictive solution to the micro-hot-plugging and micro-unplugging phenomenon that is associated with disconnection and re-connection of infinitesimally small time duration but longer than the vertical breaking time. In one embodiment, the present invention interprets the link lock status and data corruption status collectively as a predictive failure and forewarns such a mechanical failure from the hot-plugging system failure adversely impacting the host processor and further events. Concept of checksum, cyclic redundancy check, etc. is known for its deployment wherein a digit representing the sum of the correct digits in a piece of stored or transmitted digital data, against which later comparisons can be made to detect errors in the data to detect data corruption. In the present invention, the serializer block receives MIPI data from the camera sensor, checks the data and formulates a 8-bit cyclic redundancy check (CRC), appends the CRC to each defined packet of data received from the MIPI camera sensor. The deserializer block receives and extracts the cyclic redundancy check from the sensor data and maps it with the cyclic redundancy check directly received from the GMSL cable. Mismatch packets are corresponded with the link lock status of the corresponding time stamp, and data corruption due to hot plugging or unplugging is segregated. A proprietary frame with a situational information is insertable after a pre-defined numbers of data corruptions detection corresponded with link down lock status.

The present invention, as a variation incorporates an additional and redundant system safety consequent to voltage spikes and other power irregularities associated with an unplugging and plugging, whether voluntary or involuntary, by incorporating a protection hardware.

Since it is known that power is supplied from the host processor to the deserializer block and to the serializer block and the MIPI camera sensor through the serializer block, and it may appear that any link lock down status information also amounts to power interruption and power irregularities protection may be ineffective; however the present invention exploits micro-unplugging and micro-plugging instances generating voltage and current spikes which are NOT capable to damage the electronics by first few irregularities but are a definite information to process and take appropriate advance actions, like warning and planned maintenance.

Another embodiment includes an over-current and or an over-voltage spike detection coupled with a link lock status for a prescribed count is interpreted and executed/displayed as healthy or unhealthy through a circuit interrupter.

A further embodiment includes a CPU/Host Processor's utilization and memory saving measure, where the polling, the polling frequency is configurable. A user configured polling time for link check, such that the polling frequency is conditionally reducible if a connection state is unchanged for a very long time, thus reduce the CPU/Host Processor's overheads without affecting the performance. Further, for embodiment using link pin signal interrupt method to check the connection, the CPU/Host Processor's overheads is eliminated.

A connection status of the GMSL cable and a status of electrical connection of the GMSL cable imply the same.

BRIEF DESCRIPTION OF DRAWINGS

The present invention according to several embodiments shall now be described with the following accompanying drawings together with the disclosure. The drawings and descriptions provided here are illustrative and should not be construed do not limit the invention in any manner. References up to and including 100 pertain to construction and system, while references 101 onwards pertain to steps of method/process/system, wherein.

DETAILED DESCRIPTION OF THE INVENTION

Figure 1:
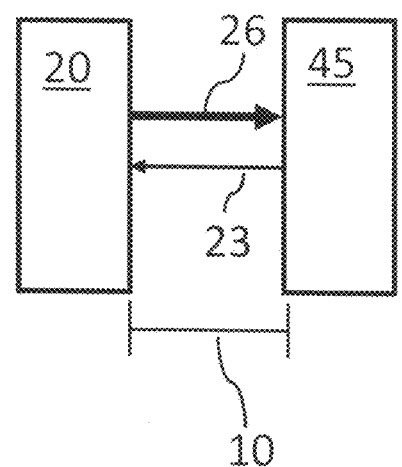
FIG. 1 is a block diagram representation of a prior art MIPI camera system.
Figure 2:
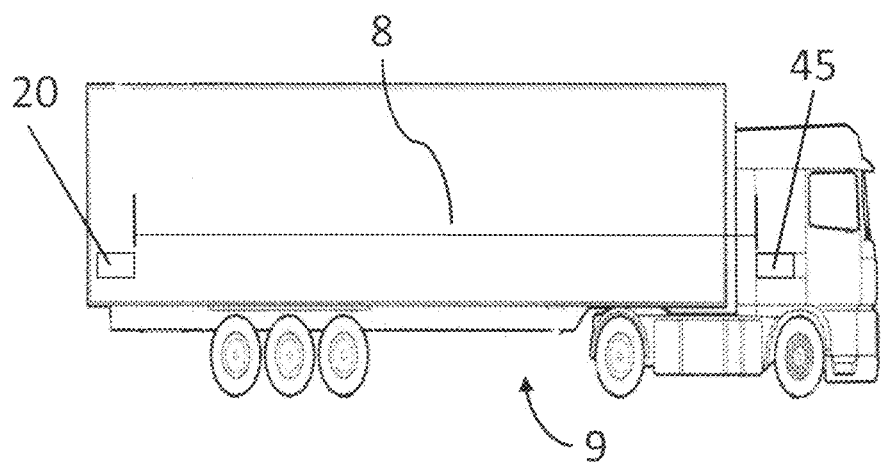
FIG. 2 is a graphic representation of need of advanced driver assistance systems (ADAS) for particularly long transport vehicles.

The present invention is specific to Gigabit Multimedia Serial Link (GMSL) based Camera System, in contrast to the system of FIG. 1 which shows a prior art non-GMSL camera system, wherein a MIPI Camera module (20) integrated with parallel or MIPI CSI-2 protocol (26) are generally interfaced with a controller (45) like NVIDIA's Jetson AGX Orin™, Jetson AGX Xavier™, Jetson Xavier™ NX, Jetson™ TX2 NX, & Jetson Nano™, NXP's i.MX8, i.MX7, & i.MX6, Texas Instruments® TDA4VM, Qualcomm® QCS610, Google Coral Dev Board, Rockchip RK3399 Board, Raspberry PI 4, to name a few. Such a non GMSL camera system could likewise be with a USB interface. Major limitation, however, is a constraint of a length (10) of a physical connection cable wires being restricted to 30 cm-100 cm. Requirements of advanced driver assistance systems (ADAS) for particularly long transport vehicles (9), shown in FIG. 2, that cannot be satisfactorily catered with the MIPI CSI-2 distance limitation, where actual physical distance (8) between camera module (20) and host controller (45) runs into several meters.

Figure 3:
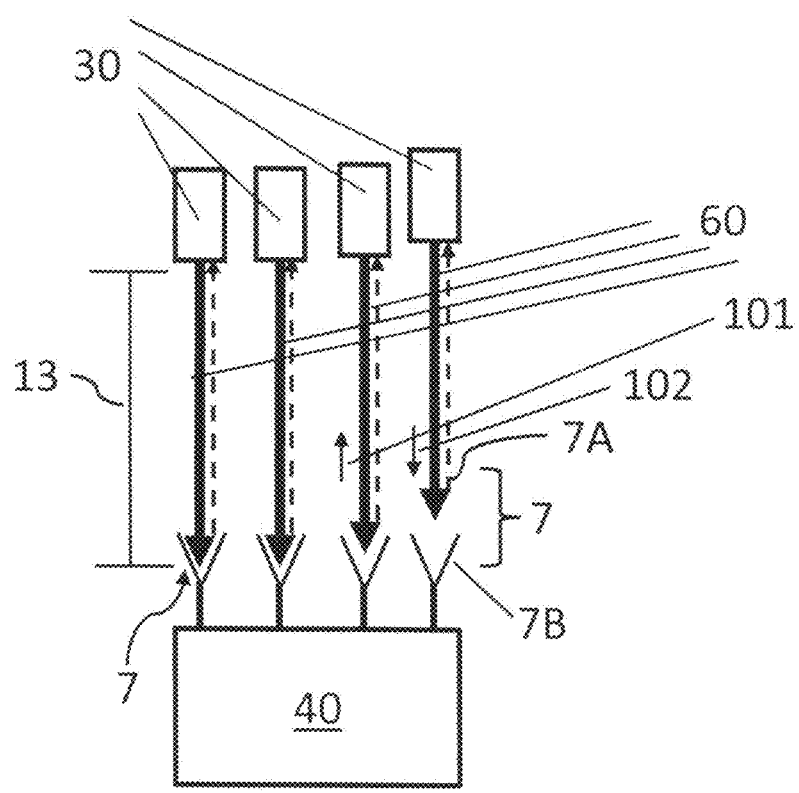
FIG. 3 is a representative view of a GMSL cable with a connector.

In simplest explanation, "serialization" is a mechanism of converting the state of a data object into a byte stream Deserialization is the reverse process. It is known that the GMSL serializer and deserializer are high speed communication integrated circuits (ICs), such as MAXIM chipset MAX9257 and MAX9258 or equivalent, that fully support the high bandwidth, complex interconnect, and data integrity requirements needed to support evolving automotive infotainment and "Advanced Driver Assistance Systems" (ADAS). With GMSL Technology, uncompressed camera video streams are transmitted over specially designed coaxial cables, termed here as a "gigabit multimedia gigabit link cable", abbreviated to a "GMSL cable" or just a "link" as shown in FIG. 3, (referenced 60), of a cable length (13) of the order of at least 15 to 30 meters, without any data loss. GMSL cable (60) is also interchangeably termed GMSL link. In general, the GMSL Serializer and Deserializer chipsets are known with a provision for respective external electrical connectors (a typical one shown, 7), through which GMSL cables (60) are plugged into, of FIG. 3. Under ideal working conditions, once the gigabit multimedia serial link is established, video and control data transfer takes place provided the GMSL cables (60) are fitted properly into the respective external electrical connectors (7). The electrical connector (7) has a cable end (7A) and a mating serializer/deserializer end (7B). The electrical connector (7) is preferably at the deserializer (40) end as shown in FIG. 3, but can also be at serializer block (30) end or at both ends.

Figure 5:
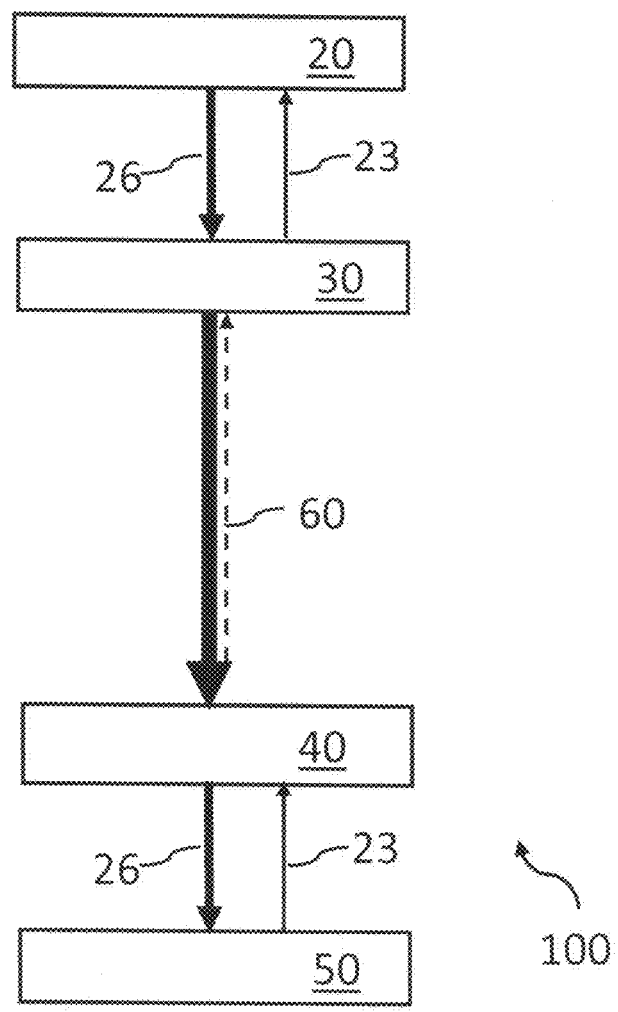
FIG. 5 is a block diagram of a MIPI camera system with a serializer and a deserializer.

Referring to FIG. 5, the present invention deploys the prior art/higher hardware Host Controller (45) with an inventive computer program resulting into and now termed a Host processor (50), a deserializer block (40) and a serializer block (30) connected to the MIPI camera sensor (20), the serializer block (30) and the deserializer block (40) being mutually compatible (illustratively the MAX9257A serializer pairs with the MAX9258A deserializer to form a complete digital video serial link), which are interconnected with a GMSL cable (60), also known as a GMSL coaxial cable.

The serializer block (30) converts MIPI CSI-2 protocol (26) to GMSL serial output while sending and receiving control channel data, enabling transmission of video and bi-directional control data over the GMSL cable (60) of at least 15 to 30 meters in length, which could be a low-cost 50Ω coaxial or a 100Ω shielded twisted pair (STP) cables meeting the GMS Link channel specification.

It is important to expressly note that GMSL cable length limitation currently of at least 15 to 30 meter is a technological limitation related to Serializer-deserializer (also known as SERDES) technology currently available, and is NOT a limitation of the present invention.

The deserializer block (40) is connected to GMSL cable (60) and re-converts GMSL input received from the serializer block (30) to MIPI CSI-2 protocol (26). It also sends and receives side-channel data, enabling full-duplex transmission of forward path video and bi-directional control data over the GMSL cable (60). When such GMSL camera system is powered up, the deserializer block (40) is initialized by the Host processor (50) which is programmed to feed electrical power to the serializer block (30) via the GMSL cable (60) or the GMSL coaxial cable (60). On receiving the electrical power, the serializer block (30) establishes a communication channel link with the deserializer block (40) via the GMSL cable (60).

The I2C protocol connection (23) as is known, is used to establish communication between two or more ICs (Integrated Circuits), hence known as Inter-Integrated Circuit (I2C) communication. I2C is essentially a synchronous, multi-controller/multi-target (master/slave), packet switched, single-ended, serial communication. I2C (23) is also represented as I2C, with number 2 as a superscript. I2C is also represented as IIC. The I2C protocol is incorporated by reference.

On receiving a request to stream from a User Application, in this case a suitable MIPI camera sensor (20) having a particular signal and communication protocol such as an I2C protocol (23), the Host Processor (50) configures the MIPI Camera sensor (20) via I2C protocol (23). As the MIPI Camera Sensor (20) outputs an array of image frames vis MIPI interface (26), the Serializer block (30) serializes the input MIPI Camera data received on the MIPI interface (26) and transmits over the GMSL cable (60). The Deserializer block (40) converts the serialized data back to proper MIPI data and feeds it to the Host Processor (50) via the MIPI protocol (26).

The present invention is focused on a nagging technological gap of hot plugging and hot unplugging destabilizing such GMSL camera system.

In context of the present invention, hot plugging implies plugging IN (101, FIG. 3) of a new GMSL cable (60), which is connected to a Camera sensor (20) through a serializer block (30), to a deserializer block (40) already powered up through a previously initialized Host Processor (50). Hot unplugging implies plugging OUT (102, FIG. 3) of a previously connected GMSL cable (60) which was connected to a Camera sensor (20) through a serializer block (30), to a deserializer block (40) already powered up through the previously initialized Host Processor (50). 'Hot unplugging' also includes damage to GMSL cable (60), serializer block (30) and or camera sensor (20) due to which the deserializer block (40) does NOT receive multimedia video/frames. Accordingly, the present invention allows easy, reliable, and flexible hot plugging and hot unplugging for maintenance and changing location of a camera sensor (20), replacing a camera sensor (20) or adding/deleting a camera sensor (20) in a GMSL camera system (100).

In the event the GMSL cable (60) is unplugged (102) during active camera data transfer, the GMSL cable (60) gets disconnected but a receiver application in the Host Processor (50) does not know that the camera is disconnected, causing it to enter an unknown state resulting in system hang/crash/instability.

Figure 4:
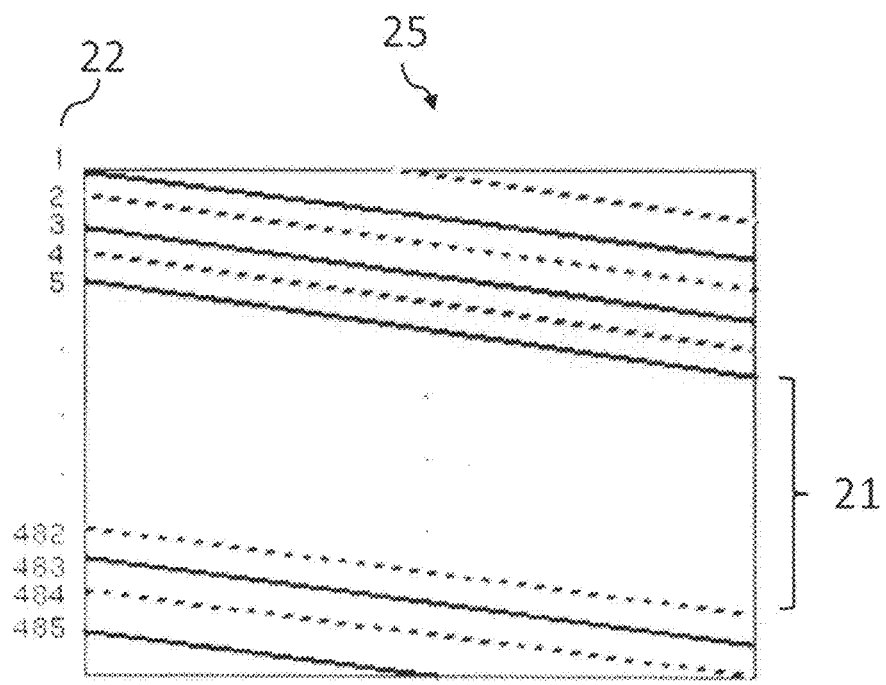
FIG. 4 is a representative view of an end of final visible line of a frame and beginning of first visible line of next frame of a video.

In situation of an interruption in the video communication in such a prior art scenario, the erstwhile Host Processor (45) would randomly look for arrival of the Camera frames and would NOT be able to re-start even if the camera frames (25 in FIG. 4) arrival halted for a marginally longer time than a vertical blanking time (21), which is a prescribed time for the deserializer block (40) shown between end of final visible line of a frame and beginning of first visible line of next frame, visible lines being frame 25 (raster) lines (22) illustratively numbered in FIG. 4. As a result, the prior art end User Application will come to a HALT state.

Figure 6:
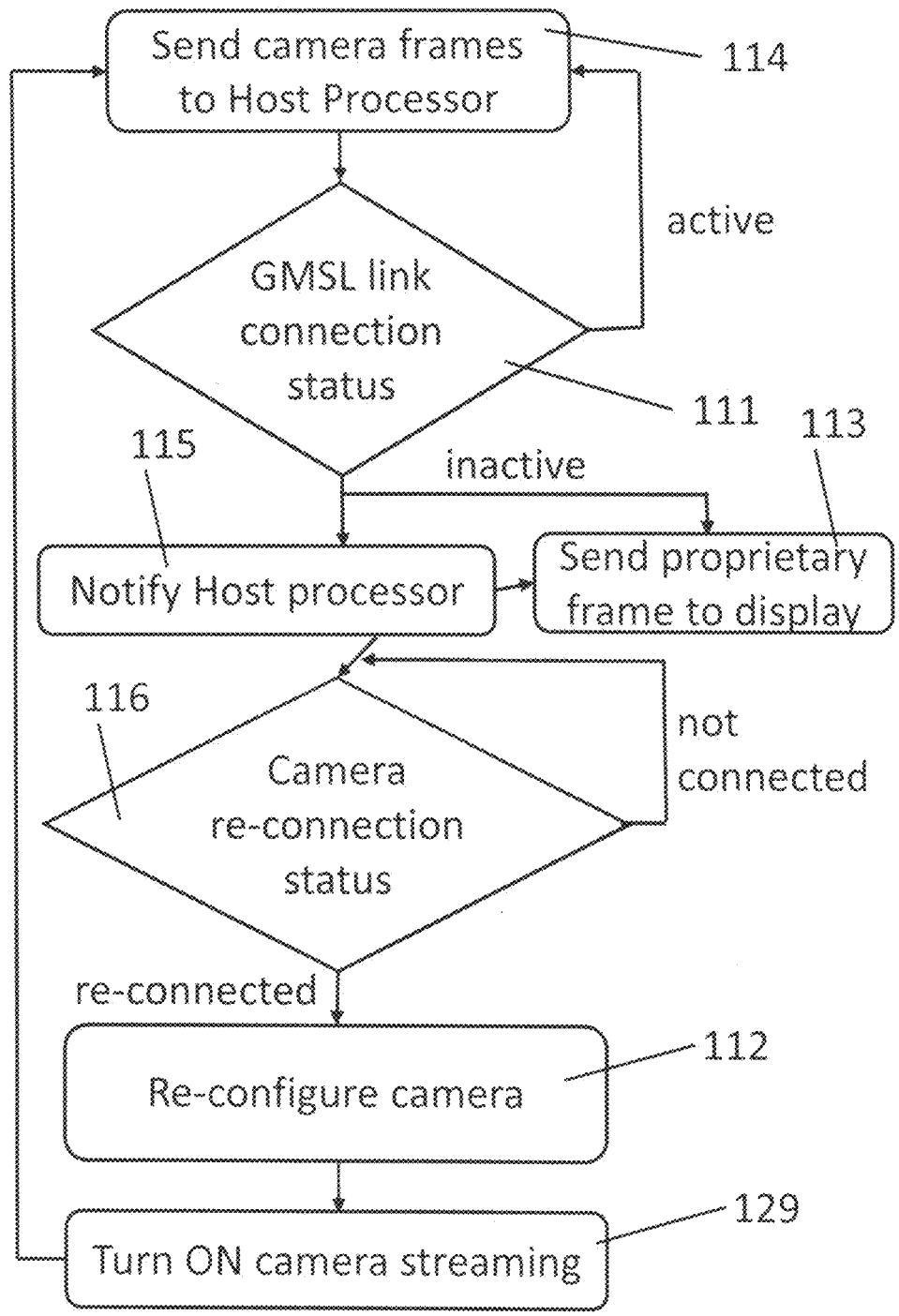
FIG. 6 is a flow diagram of high level steps of operation of the present invention.

FIG. 6, to address such scenarios, the present invention of the Hot Pluggable GMSL Camera System (100) comprising the prior art/higher hardware Host Controller (45) with the inventive computer program resulting into and now termed a Host processor (50), detects the connection status (111) of GMSL link (60) by the computer program executing a set of instructions residing in the Host processor (50), without or with addition of any further hardware or device. A unhealthy status of GMS link (60) is termed as "inactive", and a healthy status of GMSL link (60) is also termed as "active".

An "inactive" GMSL link (60) implies a state of unplugging of the camera sensor, and the computer program as per the present invention notifies (115) the Host Processor (50) and the Host Processor sends (113) at least a proprietary frame (90, FIG. 7A) to display and prevents system crash/hang. Further, the computer program keeps checking the camera re-connection status (116), once re-connection is detected, then the computer program re-configures the camera and notifies the host processor (112). The Host Processor (50) then turns ON the camera streaming (129).

Thus, as long as the GMSL link is active (60), sending of camera frames to the Host Processor User Application (114) is enabled. In the event that the GMSL cable (60) is unplugged (e.g. plug 7A from socket 7B) (102) or other failure to receive GMSL link communication, the communication gets disrupted abruptly. Upon such cable/link disconnection, the Serializer block (30), the Camera sensor (20), is turned off, the Host processor is notified, (115) and the Proprietary Frame (90, FIG. 7A) is displayed (113).

Figure 7A:
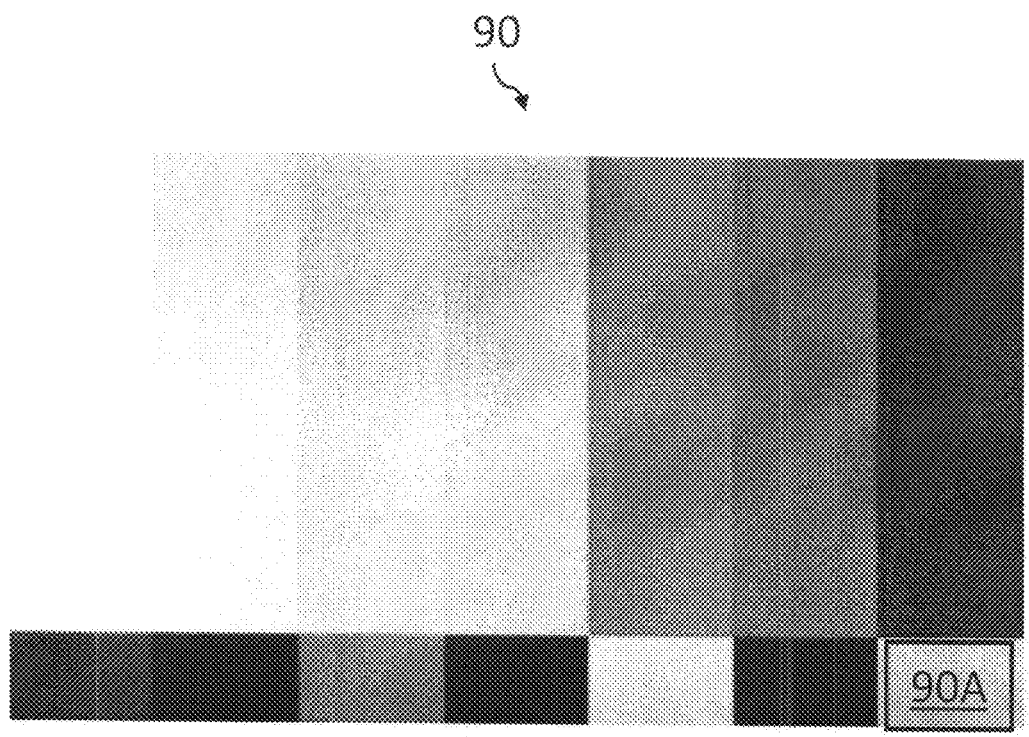
FIG. 7A, 7B are illustrative proprietary frames.
Figure 7B:
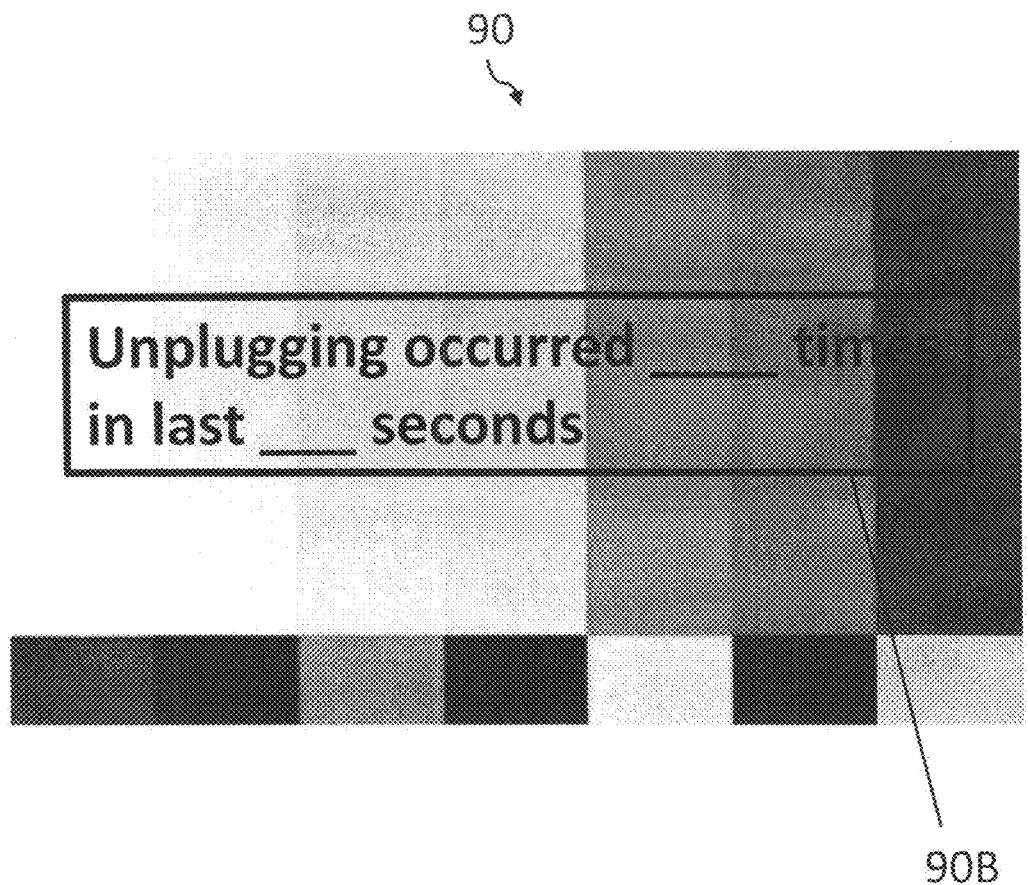

FIG. 7A is an illustrative proprietary frame (90) with a user specific information (90A). The user specific information (90A) may be a product configuration bar code, a product warranty serial number, or such ownership information. The proprietary frame (90), as a variation, also carries a situational information (90B, FIG. 7B) as needed. The situational information (90B) illustratively includes a running outage time clock, outage count in a prescribed period. The situational information is exploitable for further diagnostics. The present invention facilitates a user to select and configure his/her own proprietary frame (90). The proprietary frame (90) is an indication of system behaving as anticipated and a confirmation that the system is NOT hung/crashed.

This hot-pluggable and hot unpluggable feature allows the User to disconnect and reconnect the camera at serializer or deserializer side at any point of time while the host system is active, or the camera is streaming (129). This hot-pluggable and hot unpluggable feature also manages unintentional disconnect and reconnect situations at the camera, at serializer or deserializer side including the electrical connector (7, FIG. 3) and the GMSL cable (60) at any point of (50, FIG. 5) is active, or the camera is time while the Host Processor streaming (129).

Figure 8:
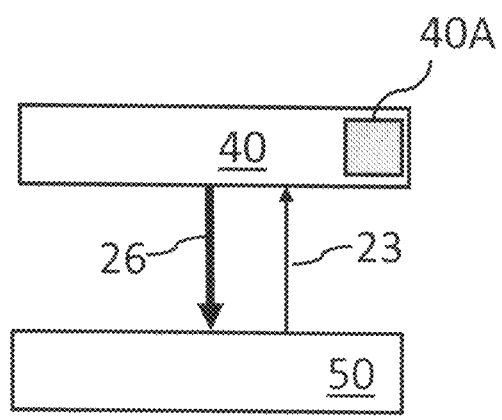
FIGS. 8, 9 and 10 are respectively three different methods/embodiments of monitoring a status of electrical connection of the GMSL cable as per present invention.

There are several embodiments of working above concept of identifying and establishing a connection status of the GMSL cable (60) or a status of electrical connection of the GMSL cable (60) with identical/minimum additional hardware. At least three embodiments of the above core method according to the present invention are as described below:

Embodiment 1: Polling of the link lock register (40A) in the deserializer block (40) via I2C interface (23), by the computer program, to check continuously if the GMSL link (60) connection is continuously established or not, that is, the connection status GMSL cable (60) is "active' or "inactive" and based on that the camera can be initialized or re-initialized or de-initialized. Such continuous polling checks whether or not the serializer block (30) and the deserializer block (40) are linked, FIG. 8. Illustratively Deserializer MAX9258A, PIN 17, Name LOCK.

Figure 9:
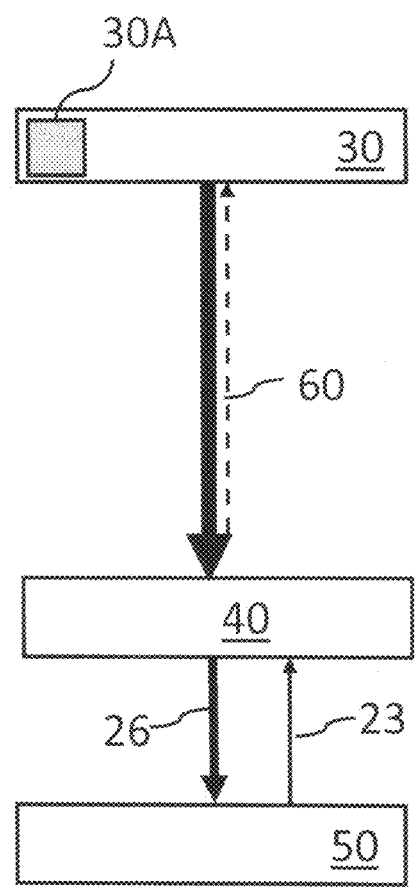

Embodiment 2: Instead of polling of the link lock register in the deserializer block (40), polling of any register (30A) in the serializer block (30) through the GMSL cable (60) by the computer program via I2C interface (23); if we get a ACK from serializer block (30) it means that the connection is present; if we get a NACK it means the GMSL link is not connected, FIG. 9. ACK and NACK imply Acknowledge (ACK) and Not Acknowledge (NACK), which are an acknowledge bite or a Non acknowledge bite respectively. Illustratively Serializer MAX9257A, Register Name—REG14, address (hex)—0x0E, power-up value (hex)—0x00, Reserved—0000 000, LOCKED=(read only)

Figure 10:
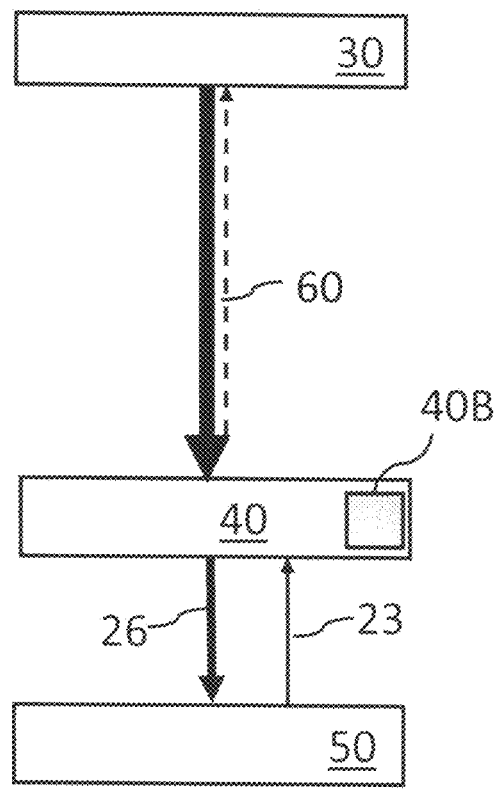

Embodiment 3: The deserializer block (40) has a link lock output pin (40B). Deserializer drives this pin TRUE (or HIGH) when serializer is connected and toggles to FALSE (or LOW) when no connection is established, which is used as an interrupt to the Host whenever a general purpose input/output (GPIO) changes its state (117), so based on the state of the GPIO, the camera is initialized or de-initialized. This method is more efficient than the method 1 and 2, as the initialization and de-initialization occurs only when the interrupt in received, and we don't have to continuously poll the register in the deserializer block (40) which may lead to I2C communication traffic issues if the frequency of the polling rate is relatively high, and we need to keep polling the register in a separate thread which would increase the CPU/Host Processor utilization. FIG. 10.

Any combination of above three software solutions is incorporable in the inventive computer program of the present invention.

FIG. 5 is the solution described as a preferred embodiment and as applicable to the Host processor (50) having I2C interfacing, illustratively processors like NVIDIA, NXP, TI, QUALCOMM which have provision for I2C interfacing.

Figure 11:
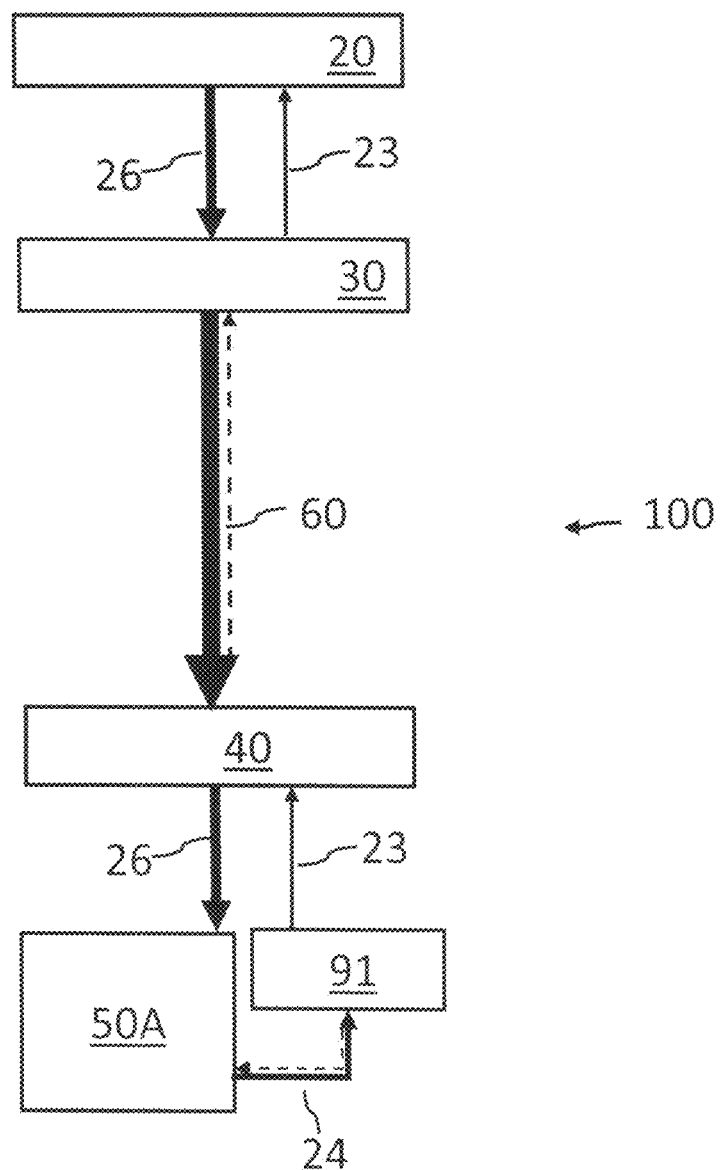
FIGS. 11 and 12 are respectively two different embodiments of hardware of the present invention.

FIG. 11, when the host processor does not have I2C processing, then an I2C communication capable microcontroller unit (91) is integrated with the deserializer block (40) and the computer program resides in and executes instruction from the microcontroller unit (91) directly or through a first non-I2C Host Processor (50A), while multimedia communication continues on MIPI interface (26) between deserializer block (40) and the first non-I2C Host processor (50A). The first non-I2C Host processor (50A) communicates with the microcontroller unit (91) on a USB protocol (24).

Figure 12:
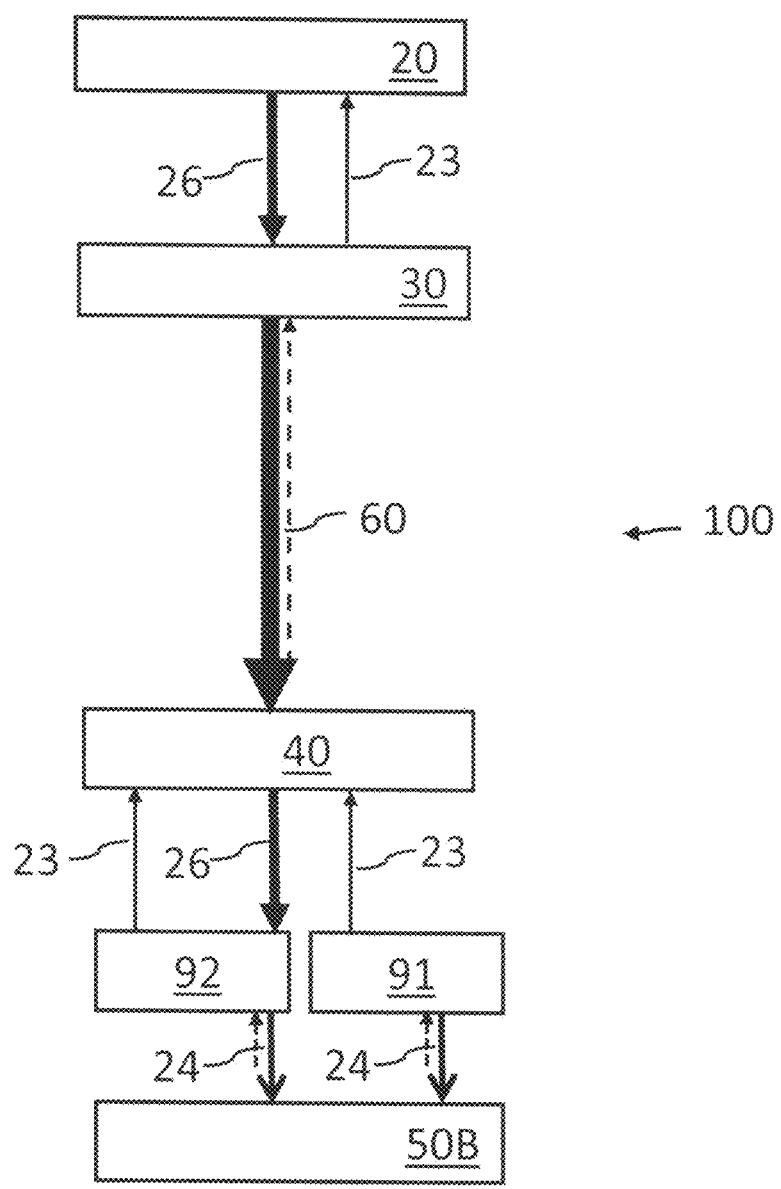
Figure 13:
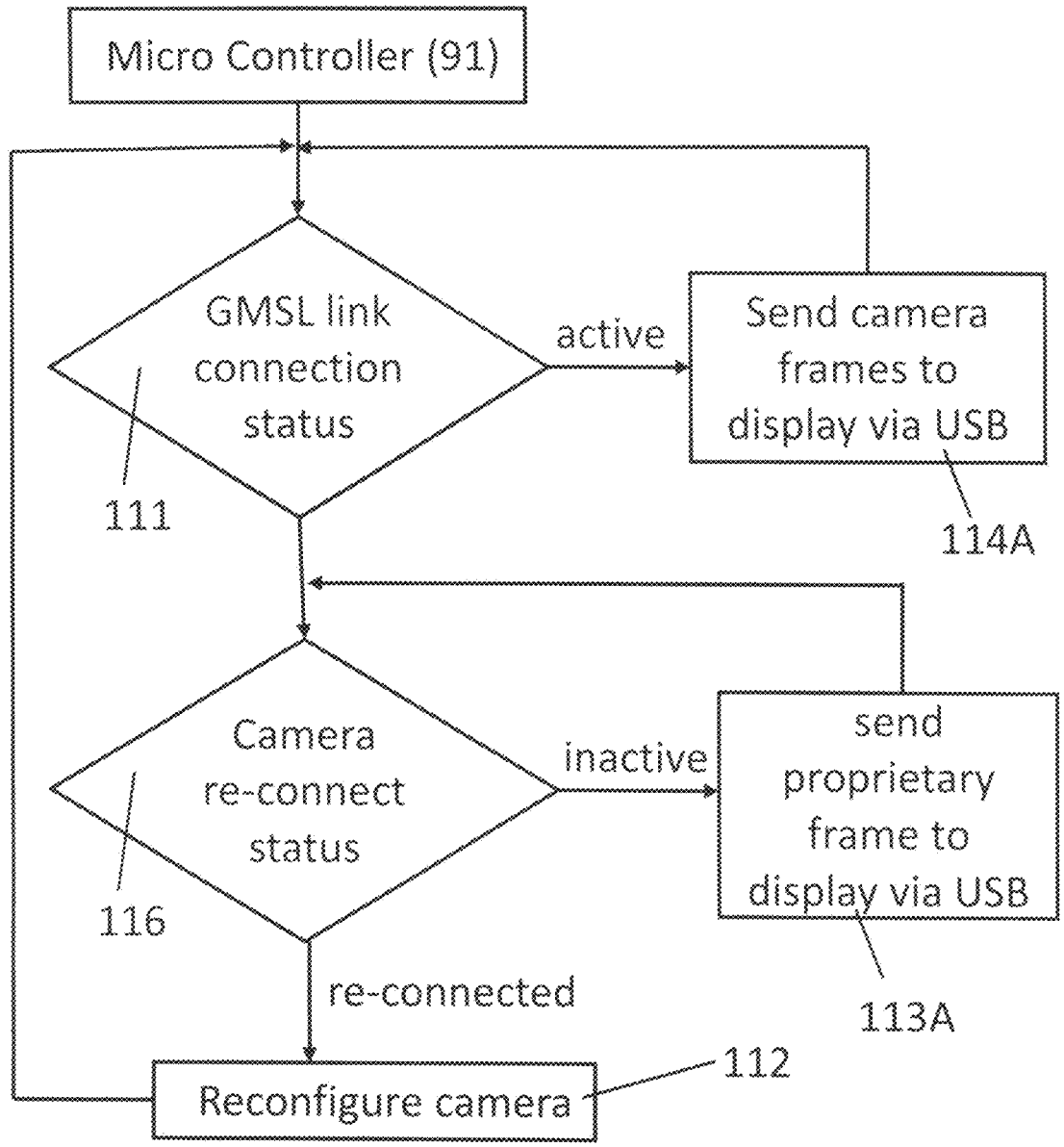
FIG. 13 is a flow diagram corresponding to hardware embodiment shown in FIG. 12.

FIG. 12, 13, when the host processor (50) neither has I2C interfacing nor MIPI interfacing (26), then an I2C communication capable microcontroller unit (91) is integrated with the deserializer block (40) and the computer program resides in and executes instruction from the microcontroller unit (91) directly or through a second non-I2C Host Processor (50B), while multimedia communication continues on USB protocol (24) between deserializer block (40) and the second non-I2C Host processor (50B). The deserializer block (40) is connected to the second non-I2C Host Processor (50B) on a USB interface (24) via a USB Controller (92), the USB Controller (92) receiving the video stream/frames from the deserializer (40) on the mobile industry processor interface (MIPI). The Hot Pluggable GMSL Camera System (100) detects the connection status (111) of GMSL link (60) by a computer program executing a set of instructions residing in the Microcontroller (91). A unhealthy status of GMS link (60) is termed as "inactive", and a healthy status of GMSL link (60) is also termed as "active". An "inactive" GMSL link (60) implies a state of unplugging of the camera sensor, and the computer program as per the present invention sends (113) at least a proprietary frame (90, FIG. 7A) to display via the USB controller (92) and prevents system crash/hang. Further, the computer program keeps checking the camera re-connection status (116), once re-connection is detected, then the computer program re-configures (112) the MIPI camera sensor (20).

Hot plugging and hot unplugging includes a micro-hot-plugging and micro-unplugging, a phenomenon that is associated with disconnection and re-connection of infinitesimally small time duration but longer than the vertical breaking time (21, FIG. 4). This phenomenon is a result of vibrations and may eventually lead to a mechanical failure of an electrical connection within an electrical connector (7, FIG. 3). Such micro-hot plugging and micro-unplugging is a physical and consequential electrical phenomenon associated with a current and or a voltage spike and with a higher probability of data corruption. While such a gradually developing failure may not be otherwise detectible till a complete breakdown of communication takes place, the present invention provides a predictive solution.

Figure 14A:
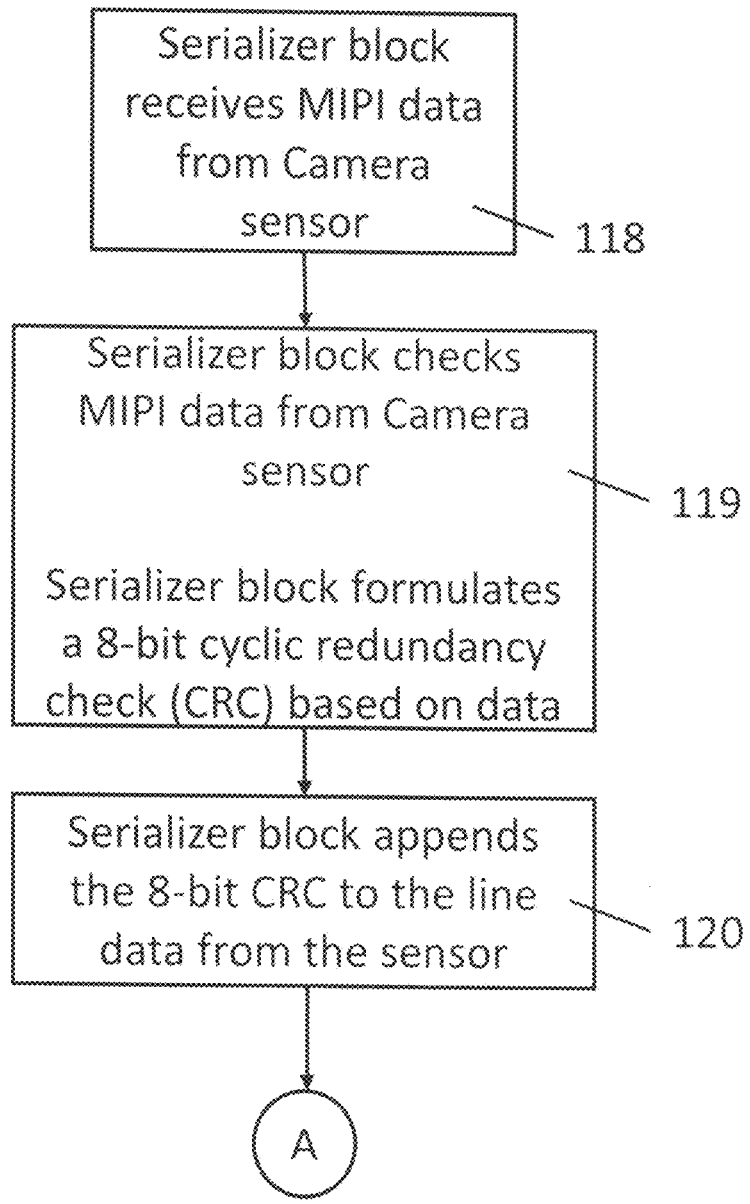
FIG. 14A, 14B are a flow diagram related to a cyclic redundancy check.
Figure 14B:
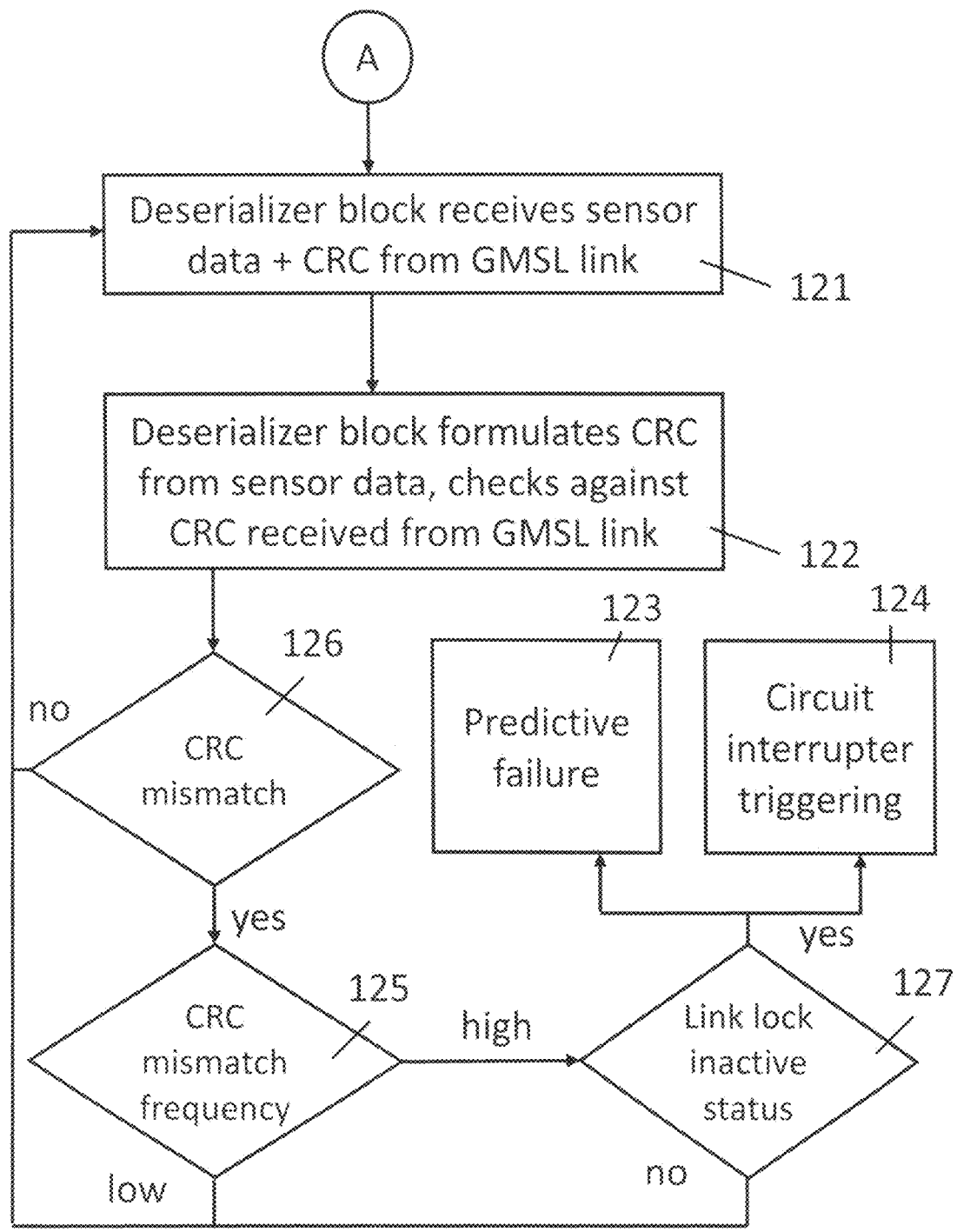

FIG. 14A, 14B, the computer program of the present invention interprets the connection status of GMSL link (60) and data corruption status collectively as a predictive failure (123) and forewarns such a mechanical failure from the hot-plugging system failure adversely impacting the Host Processor (50, 50A, 50B) and further events. Host Processors generally have an electronic clock and a time stamp provided through the computer program is an assertion that a piece of electronic data existed at a particular time of the electronic clock. Concept of checksum, cyclic redundancy check, etc. is known for its deployment wherein a digit representing the sum of the correct digits in a piece of stored or transmitted digital data, against which later comparisons can be made to detect errors in the data to detect data corruption. In the present invention, the serializer block (30) formulates (119) and appends (120) an 8-bit cyclic redundancy check (CRC) with each defined packet of data received (118) from the MIPI camera (20). The deserializer block (40) extracts (122) the cyclic redundancy check from the sensor data and maps it with the cyclic redundancy check directly received (121) from the GMSL cable (60). CRC Mismatch packets (126) are corresponded with the connection status of GMSL link (60) bearing corresponding time stamp, and such data corruption due to hot plugging or unplugging is segregated and interpreted as unsafe and hazardous.

Thus, a CRC mismatch recorded with a time stamp of an instance T1 and an unplugging detection of the same time instance T1 is interpreted by the computer program as a data corruption due to unplugging, and correspondingly interpreted and acted upon. Also, several link "inactive" status (127) implying unintended unpluggings and pluggings, recorded in rapid succession or a short time duration of the order of less than a second to few seconds, with or without recordation of CRC mismatch (125) of high frequency and the identical instance of time stamp are interpreted as involuntary and unintended and accordingly acted upon for safety and protection of the system (100), causing the computer program to issuing an alarm/warning for a predictive failure (123), triggering (124) a circuit interrupter (93).

The proprietary frame (90) with the situational information (90B) is inserted by the computer program, after a pre-defined numbers of data corruptions detection corresponded with "inactive" status.

Figure 15:
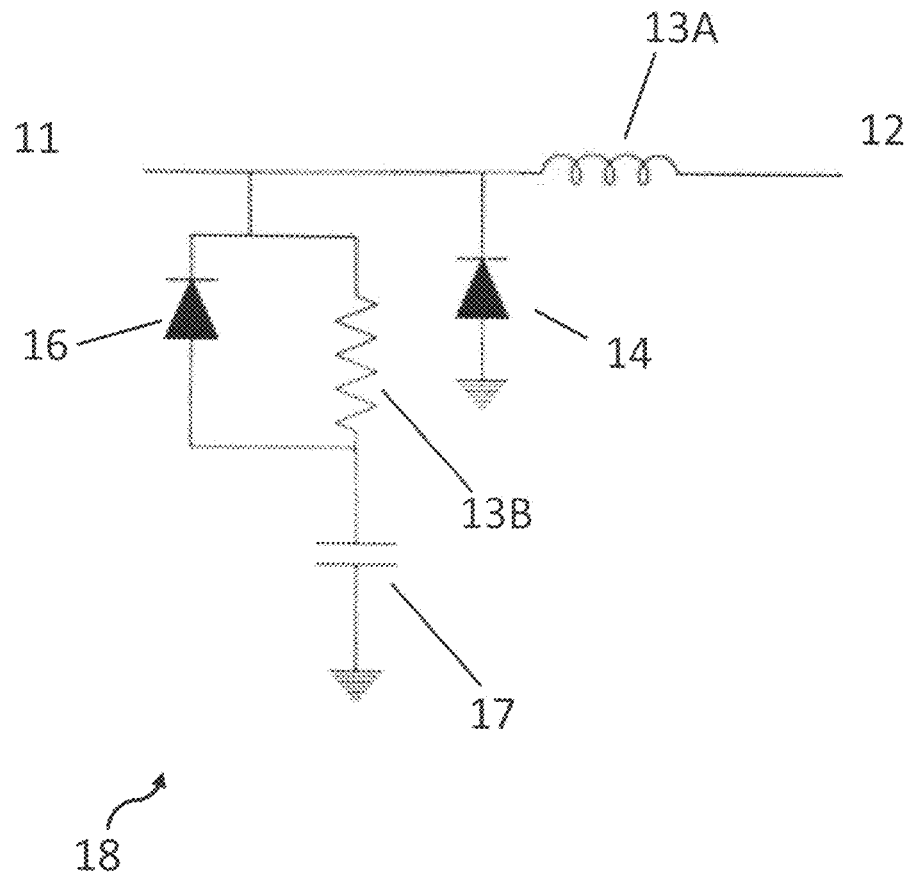
FIG. 15 is a schematic of a protection hardware specific to hot plugging and hot unplugging as per the present invention.

FIG. 15, the present invention, additionally incorporates a redundant system safety consequent to voltage spikes and other power irregularities, particularly associated with an unplugging and plugging, whether voluntary or involuntary, by incorporating a redundant protection hardware assembly (18) having at least a transient suppression diode (14), a capacitor discharge diode (16) to discharge the voltage supporting capacitor (17) against any voltage dip, a resistance-inductance combination (13A, 13B) to moderate an inrush current. It is important to note that the present invention particularly facilitates and supports hot plugging and unplugging and the redundant hardware assembly (18) inserted in-between a power supply (19) from an incoming power side or the host processor side (11) and the camera side (12) makes the present invention, particularly the camera sensor (20) immune to additional risks due to hot plugging, micro-hot plugging, hot unplugging and micro-hot unplugging. The redundant protection hardware assembly (18) is integrated with the GMSL camera system (100) or modularly added, with any of the embodiments described or possible around the present inventive concept.

Figure 16:
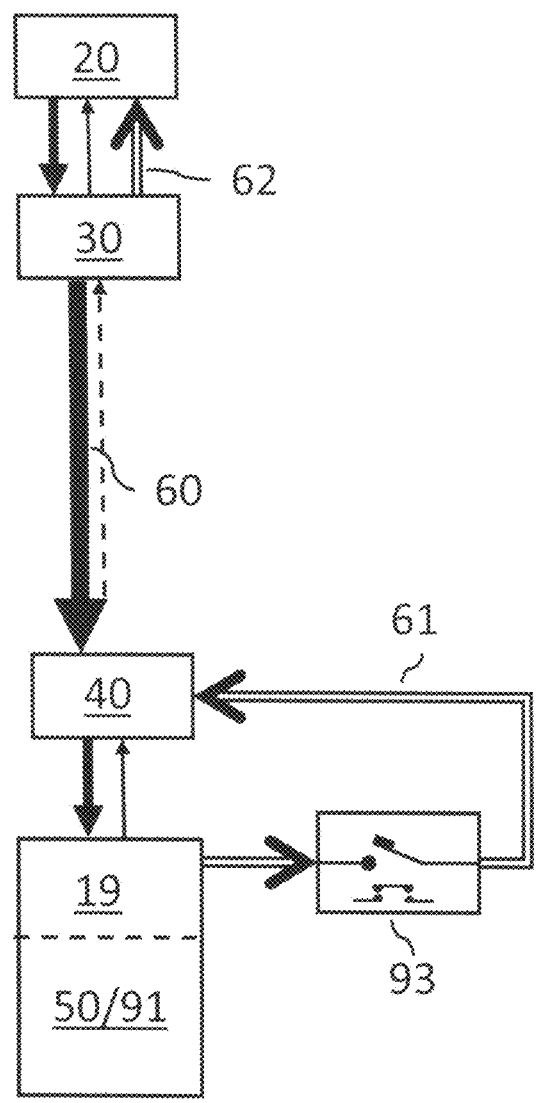
FIG. 16 is a block diagram related to a predictive failure due to a micro-hot plugging/micro unplugging.

FIG. 16, in the present invention, the electric power is supplied from the power supply (19), as commanded and regulated by the computer program of the Host Processor (50, 50A, 50B) or the microcontroller (91), to the deserializer block (40) via a first electric connection (61), to the serializer block (30) and the MIPI camera sensor (20) through the serializer block (30) via the GMSL cable (60) and the second electric connection (62) respectively, and it may appear that GMSL link "inactive" may always amount to power interruption and power irregularities protection may be ineffective!. However, the present invention exploits micro-unplugging and micro-plugging instances generating voltage and current spikes which are NOT capable to damage the hardware by first few irregularities but are a definite information to process and take appropriate advance actions, like warning and planned maintenance, besides switching off. An over current and or an overvoltage spike detection in electric supply coupled with GMSL link "inactive" status for a prescribed count is interpreted and executed/displayed by the computer program as healthy or unhealthy through the Host Processor (50)/Microcontroller (91) triggering (124) the circuit interrupter (93). The circuit interrupter (93) may be a transistor switching device, for example a triac, or a miniature circuit breaker. The circuit interrupter (93) can issue a fault detection output to the Host Processor (50) and or disconnect the electric supply. Circuit interrupter (93) is integrally equipped with an overcurrent sensor and or an overvoltage sensor (93A); or such sensors are separately provided.

Figure 17A:
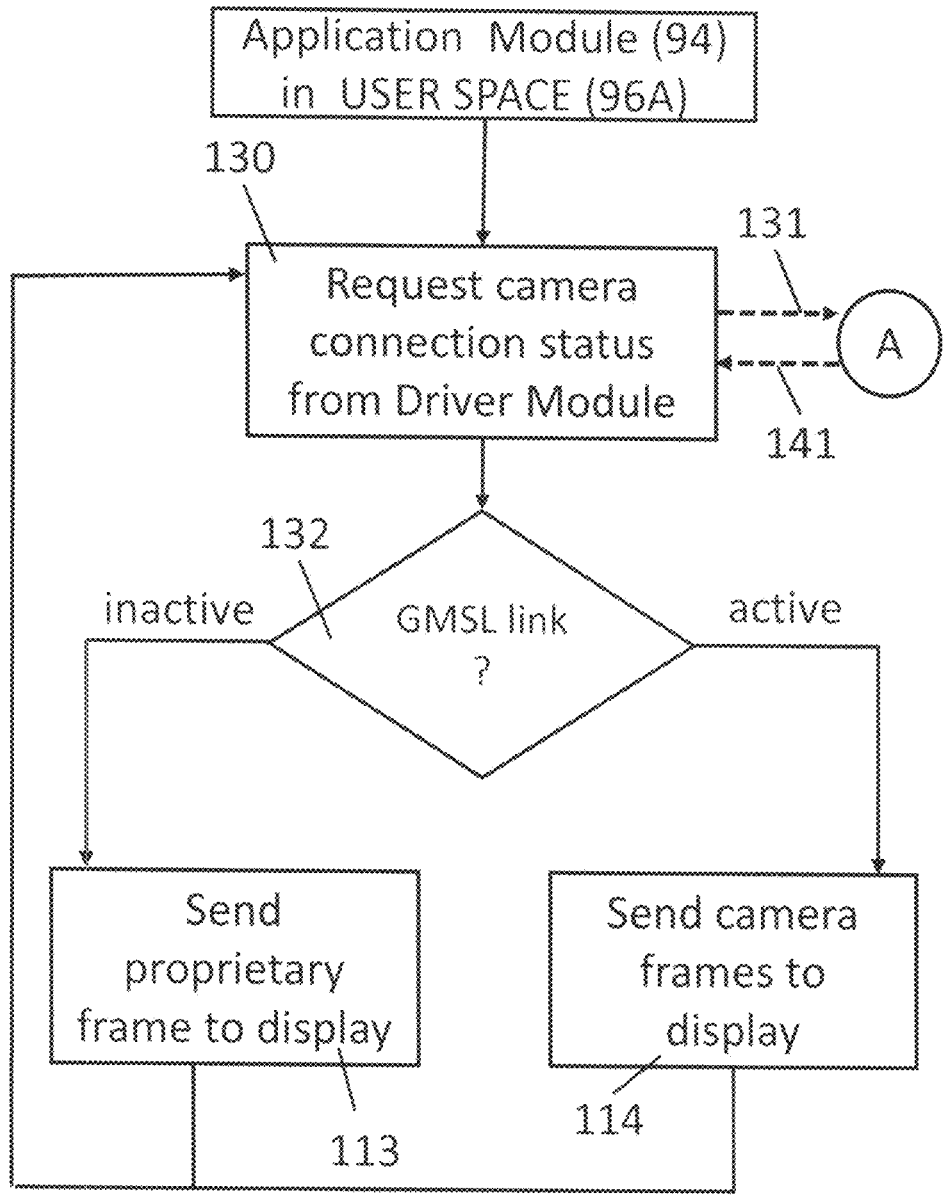
FIG. 17A, 17B is a flow diagram related to optimal CPU/Host Processor utilization in one embodiment.
Figure 17B:
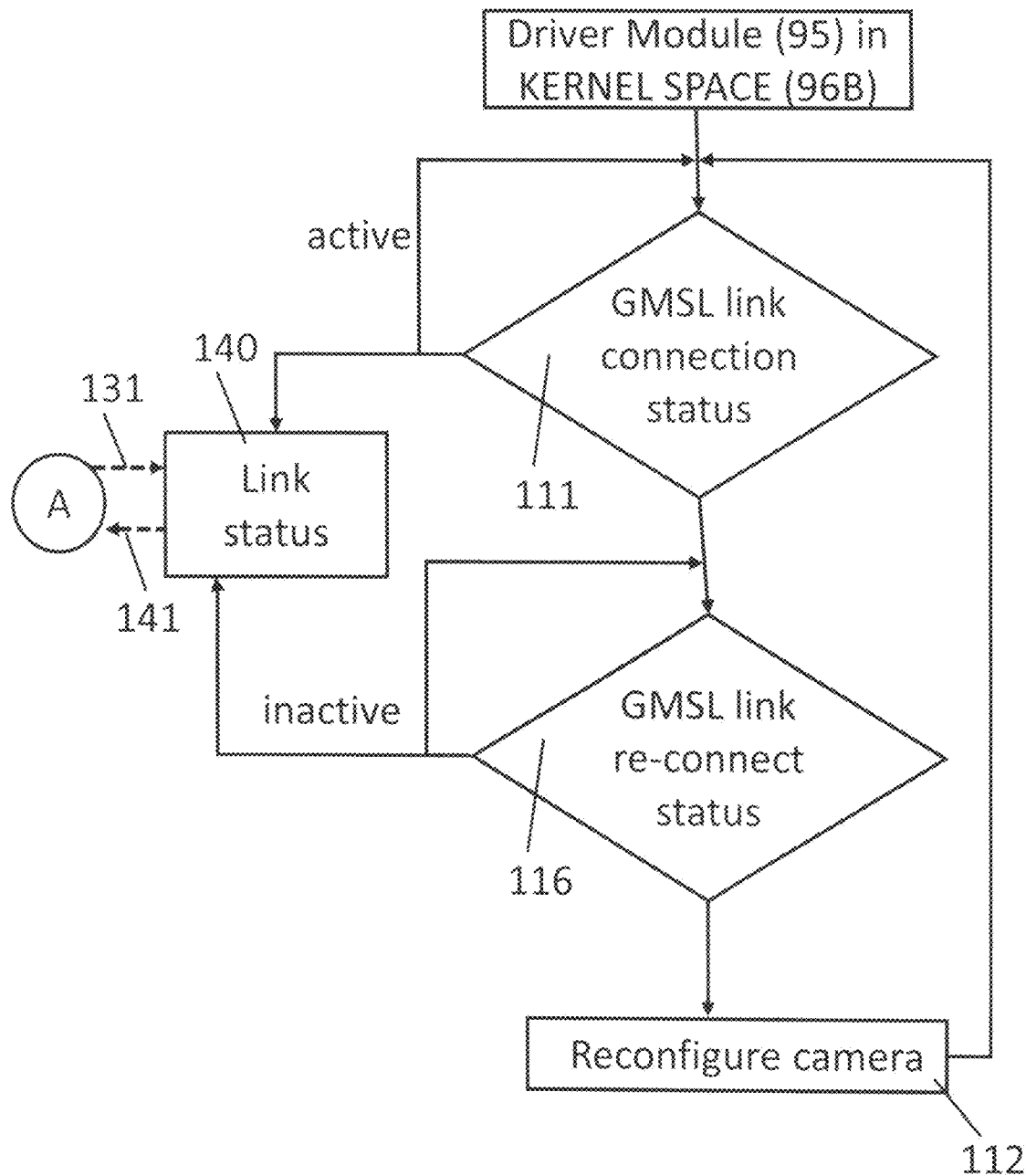

FIG. 17A read with FIG. 17B, the hot-Pluggable GMSL Camera System (100) as per the present invention executes a computer program comprising an application module (94) residing in a user space (96A) of a non-volatile memory of the Host Processor (50) and a driver module (95) residing in a kernel space (96B) of the non-volatile memory of the Host Processor (50), as per the hardware deployed, and the gross steps comprise:
  a. requesting camera connection status (130) by sending periodically (131) a system input/output control (IOCTL) call by the application module (94) to the driver module (95)
  b. continuously determining (111, 116) the GMSL link connection status (140) by the driver module (95)
  c. receiving (141) periodically by the application module in the user space the connection status of the corresponding GMSL cable (60) from the driver module (95), wherein the connection status of the GMSL cable (60) is one of an "active" and an "inactive"
  d. determining GMSL link status (132) as "active" or "inactive"
  e. sending to display by the application module (94) one of
    a proprietary frames (90) when the link connection status is "inactive" (113), and
    a camera frames when the link status is "active" (114)
  f. checking periodically (111, 116) of connection status of the at least one GMSL cable (60) by the driver module (95)
  g. re-configuring (112) of the MIPI camera sensor (20) by the driver module when a link connection status changes from the "inactive" to the "active"

Figure 18A:
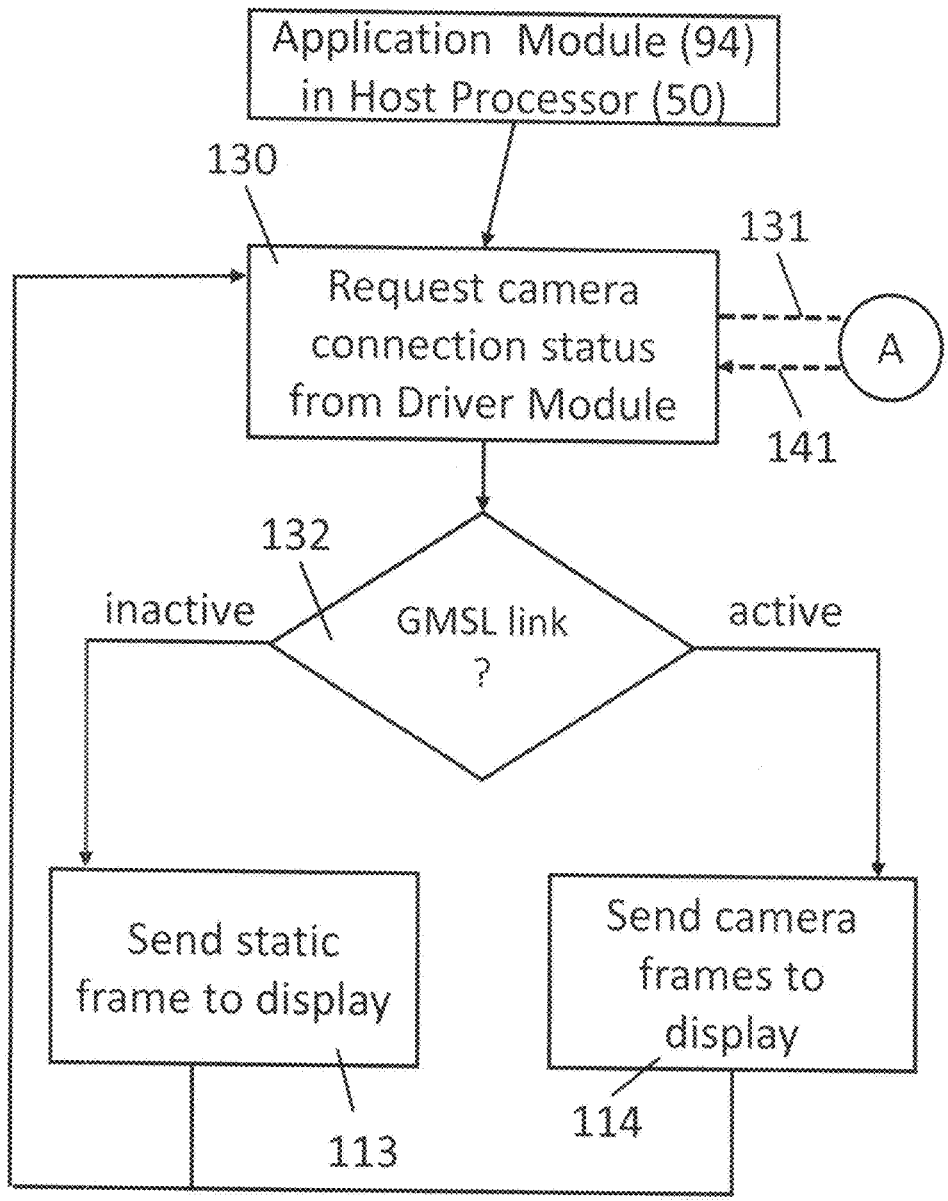
FIG. 18A, 18B is a flow diagram related to optimal CPU/Host Processor utilization in another one embodiment.
Figure 18B:
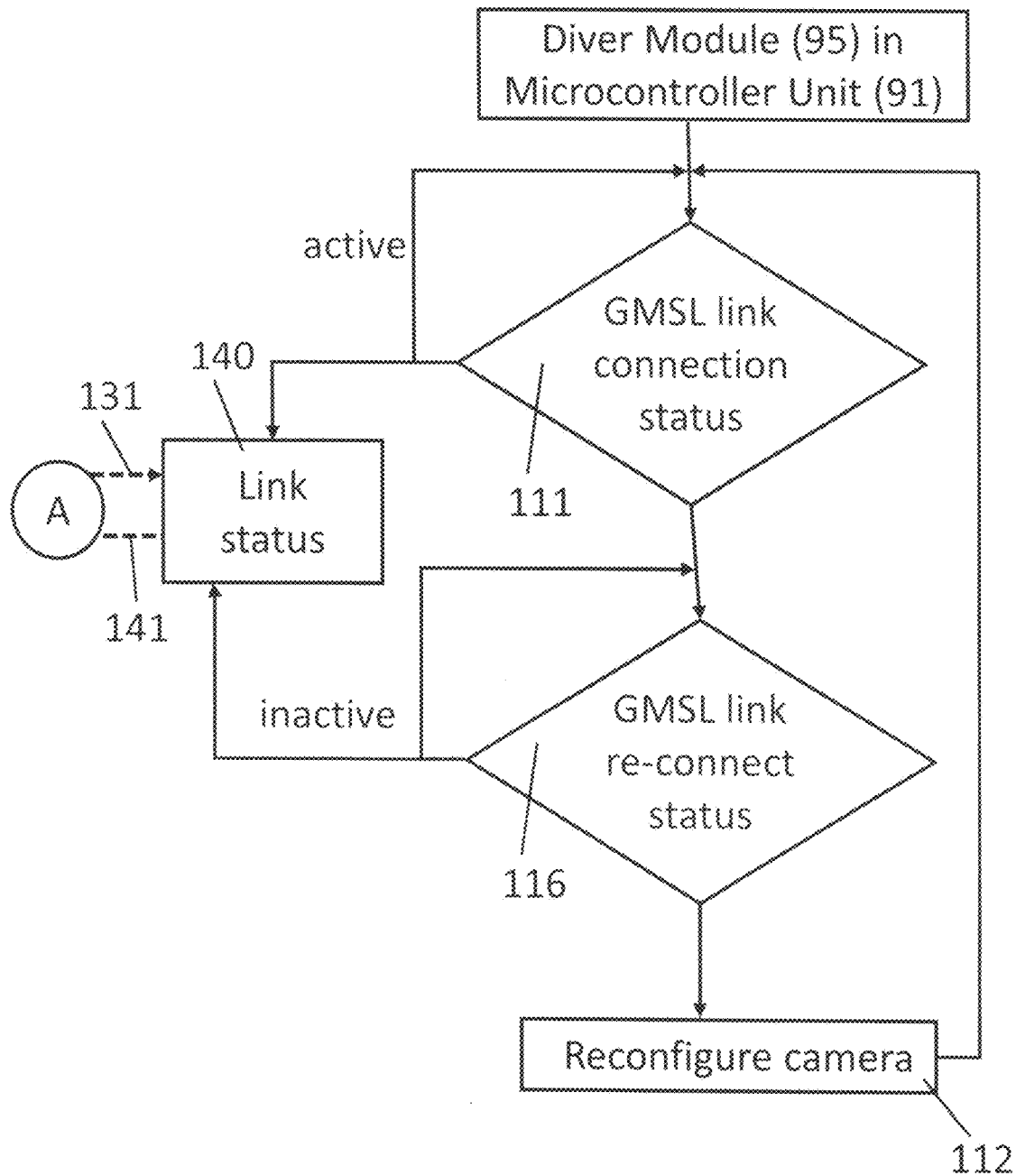

FIG. 18A read with FIG. 18B, the hot-Pluggable GMSL Camera System (100) as per the present invention executes the computer program comprising an application module (94) residing in the first non-I2C Host Processor (50A) or the second non-I2C Host processor (50B), and a driver module (95) residing in the microprocessor (91) suitable for I2C communication, as per the hardware deployed, and the gross steps comprise:
  a. requesting camera connection status (130) by sending periodically (131) a system input/output control (IOCTL) call by the application module (94) to the driver module (95)
  b. continuously determining (111, 116) the GMSL link connection status (140) by the driver module (95)
  c. receiving (141) periodically by the application module (94) the connection status of the corresponding GMSL cable (60) from the driver module (95), wherein the connection status of the GMSL cable (60) is one of an "active" and an "inactive"
  d. determining GMSL link status (132) as "active" or "inactive"
  e. sending to display by the application module (94) one of
    a proprietary frames (90) when the link connection status is "inactive" (113), and
    a camera frames when the link status is "active" (114)
  f. checking periodically (111, 116) of connection status of the at least one GMSL cable (60) by the driver module
  g. re-configuring (112) of the MIPI camera sensor (20) by the driver module when a link connection status changes from the "inactive" to the "active"

Importantly, the computer program detecting a connection link status change from active to inactive to active in succession of less than one second, or such high frequency (125, FIG. 14B), in an identified time frame is mapped with cyclic redundancy mismatch in the corresponding time frame; and the computer program either issues an alarm/warning for a predictive failure, or issues instructions for triggering (124) a circuit interrupter (93), if the hot unplugging and hot plugging amounts to an unsafe situation of the micro-hot plugging and the micro-hot unplugging.

The Hot-Pluggable GMSL Camera System (100) as per the present invention is configurable and auto-configurable for periodicity so as to optimize CPU/Host processor utilization time. Hence, if the micro-hot unplugging is not detected for a prescribed "safe" time, then the computer program is user adaptable to run a sub-routine to reduce polling periodicity for a corresponding "relax" time, before resuming to previously set periodicity. Such "safe" time and "relax time" is based on user's need, experience and specific application. The "safe" time and the "relax" time may be several milliseconds to several minutes.

Thus, as a CPU/Host Processor utilization and memory saving measure, the polling frequency of the link lock resistor of the deserializer (40), the polling frequency of any resistor of the serializer (30) is configurable. Such user configurable polling frequency is conditionally reducible if a connection status of the GMSL link (60) is unchanged for a very long time, thus reduce the Host Processor's utilization time without affecting the performance. Further, for embodiment using link pin interrupt method to check the connection, the Host Processor's continuous utilization is reduced.

The Hot-Pluggable GMSL Camera System (100) as per present invention may deploy a situational diagnostic contents or situational information (90B) on the proprietary frame (90) for handling other situations related to safety and upkeep of hardware.

GMSL cable (60) and GMSL link (60) imply the same. A connection status of the GMSL cable (60) and a status of electrical connection of the GMSL cable (60) imply the same. Wherever polling of link lock register is referred to for the connection status of the GMSL cable (60) or the status of electrical connection of the GMSL cable (60), it also implies polling of any register, or a link lock output pin which can be used as an interrupt to the Host Processor whenever a general purpose input/output (GPIO) changes its state.

The invention claimed is:
1. A Hot-Pluggable GMSL Camera System comprising:
  a. a mobile industry processor interface (MIPI) camera sensor;
  b. a serializer block;

c. a deserializer block, wherein the serializer block and the deserializer block are mutually compatible;

d. a gigabit multimedia serial link cable (GMSL) cable connecting the serializer block with the deserializer block; and e. an continuously activated Host Processor connected to the deserializer block;

wherein the MIPI camera sensor receives control data from the Host Processor through the serializer block through an I2C protocol and sends video frames to the Host Processor through a MIPI protocol, the serializer block is connected to the deserializer block by the GMSL cable through an electrical connector;

the MIPI camera sensor and the corresponding serializer block are powered through the corresponding GMSL cable and activated by the Host Processor;

the deserializer block provides a status of an electrical connection of the GMSL cable which is communicated to the Host Processor, an unplugging of the activated GMSL cable connector communicated to the Host Processor; and a plugging and resulting connection of an unconnected GMSL cable connector communicated to the Host Processor.

2. The Hot-Pluggable GMSL Camera System as claimed in claim 1, wherein the status of the electrical connection and of the GMSL cable is provided by a continuous polling of a link lock register in the deserializer block, via an I2C protocol by the Host Processor.

3. The Hot-Pluggable GMSL Camera System as claimed in claim 1, wherein the status of electrical connection and of the GMSL cable is a continuous polling of a register in the serializer block by the Host Processor, via an I2C protocol, an acknowledge (ACK) signal from the serializer block signaling the electrical connection as busy, a Not acknowledge (NACK) signal signaling the serializer is in a 'wait' state.

4. The Hot-Pluggable GMSL Camera System as claimed in claim 1, wherein the status of the electrical connection and of the GMSL cable is a HIGH state or LOW state of a link lock output pin of the deserializer block, wherein the deserializer block driving the link lock output pin HIGH (locked) when the serializer block is connected, and LOW (not locked) when no synchronous connection is established between the serializer and deserializer, and a change of state of the link lock output pin causes an interrupt to the Host Processor.

5. The Hot-Pluggable GMSL Camera System as claimed in claim 1, wherein the deserializer block communicates with the Host Processor through an I2C protocol for receiving control data and communicates through MIPI or Parallel protocol for sending camera frames.

6. The Hot-Pluggable GMSL Camera System as claimed in claim 1, wherein the Host Processor is a first non-I2C Host Processor, the deserializer block is connected to an I2C communication capable microcontroller unit for sending control data to the MIPI camera sensor through the GMSL cable, and communicates with the first non-I2C Host Processor through MIPI or Parallel protocol for sending camera frames.

7. The Hot-Pluggable GMSL Camera System as claimed in claim 1, wherein the Host Processor is a second non-I2C Host Processor, the deserializer block communicates with the second non-I2C Host Processor through a universal serial bus (USB) protocol via a USB Controller, the USB Controller receives the video stream/frames from the deserializer block via the mobile industry processor interface (MIPI) protocol, and sends the video stream/frames to the second non-I2C Host processor via the USB protocol, an I2C communication capable microcontroller unit is connected to the deserializer block for sending control data to the MIPI camera sensor through the GMSL cable.

8. The Hot-Pluggable GMSL Camera System as claimed in claim 1, wherein the status of electrical connection and of the GMSL cable of a time stamp is mapped with a mismatch of a cyclic redundancy check of the same time stamp, interpreting such data corruption consequent to a micro-hot-plugging and or a micro-hot-unplugging to trigger a circuit interrupter.

9. The Hot-Pluggable GMSL Camera System as claimed in claim 1, wherein the status of electrical connection and of the GMSL cable in a given time frame is mapped for a cyclic redundancy check mismatch occurrences in the same time frame, to predict a likely electro-mechanical failure of one or more of the corresponding electrical connector, the GMSL cable, the serializer block, and the MIPI camera sensor.

10. The Hot-Pluggable GMSL Camera System as claimed in claim 1, wherein the GMSL cable is one of a 50Ω coaxial cable and a 100Ω single twisted pair cable.

11. The Hot-Pluggable GMSL Camera System as claimed in claim 1, wherein the Hot-Pluggable GMSL Camera System has a redundant protection hardware assembly connected between the MIPI camera sensor and the Host Processor, to provide continuity of power in the event of irregularities due to hot plugging, micro-hot plugging, hot unplugging and micro-hot unplugging.

12. A Hot-Pluggable GMSL Camera System comprising:

a. a mobile industry processor interface (MIPI) camera sensor, b. a serializer block connected to the MIPI camera sensor, c. a deserializer block, d. a gigabit multimedia serial link (GMSL) cable, and e. an activated Host Processor; wherein the MIPI camera sensor receives a control data through the serializer block through an I2C protocol and sends a video frames through the MIPI protocol, the serializer block is connected to the corresponding deserializer block by the GMSL cable, the Host Processor being continuously activated, the MIPI camera sensor and the corresponding serializer is powered through the corresponding GMSL cable and is activated by the Host Processor through the deserializer block, a status of electrical connection of the GMSL cable is communicated from the deserializer block to the Host Processor, an unplugging of the activated GMSL cable is communicated to the Host Processor, a plugging of another GMSL cable communicated to the Host Processor, the Host Processor including a computer program comprising an application module and a driver module, configured to execute the steps comprising:

a. requesting a connection status from the MIPI camera by sending periodically a system input/output control (IOCTL) call by the application module to the driver module, b. continuously determining the GMSL cable connection status by the driver module, c. receiving periodically by the application module the connection status of the corresponding GMSL cable from the (driver module, wherein the connection status of the GMSL cable is one of an "active" and an "inactive,"
d. determining GMSL cable connection status as "active" or "inactive,"
e. sending to display by the application module one of
   a proprietary frames when the connection status is "inactive", and
   a camera frames when the link status is "active,"
f. checking periodically of connection status of the at least one GMSL cable by the driver module, and
g. re-configuring of the MIPI camera sensor by signals from the driver module when a connection status changes from the "inactive" to the "active".

13. The Hot-Pluggable GMSL Camera System as claimed in claim 12, wherein the computer program detects a connection status change from active to inactive to active in succession of less than one second in an identified time frame that is mapped with a cyclic redundancy mismatch detected in the corresponding connection time frame.

14. The Hot-Pluggable GMSL Camera System (100) as claimed in claim 13, wherein the computer program issues instructions to trigger a circuit interrupter to disconnect power to the deserializer, the GMSL cable, the serializer and the MIPI camera.

15. The Hot-Pluggable GMSL Camera System as claimed in claim 13, wherein the computer program issues an alarm/warning for a predictive failure.

16. The Hot-Pluggable GMSL Camera System as claimed in claim 12, wherein the sending periodically of the system IOCTL call by the application module is configurable so as to optimize a utilization time of the Host Processor if the micro-hot-unplugging is not detected for a prescribed "safe" time.

17. The Hot-Pluggable GMSL Camera System as claimed in claim 12, wherein the sending, by the application module, a proprietary frames to a user output is with a situational information.

18. The Hot-Pluggable GMSL Camera System as claimed in claim 12, wherein the computer program detecting a connection status change from active to inactive to active in succession of less than one second in an identified time frame is a situational information of a micro-unplugging and a micro-hot-plugging.

19. The Hot-Pluggable GMSL Camera System as claimed in claim 12, wherein the application module resides in a user space of a non-volatile memory of the Host Processor and the driver module resides in a kernel space of the non-volatile memory of the Host Processor.

20. The Hot-Pluggable GMSL Camera System as claimed in claim 12, wherein the application module resides in one of a first non-I2C Host Processor and a second non-I2C Host Processor, while the driver module resides in a I2C communication capable microcontroller unit.

\* \* \* \* \*